(12) United States Patent
Sibley

(10) Patent No.: US 11,595,628 B2
(45) Date of Patent: Feb. 28, 2023

(54) PROJECTION SYSTEM AND METHOD FOR THREE-DIMENSIONAL IMAGES

(71) Applicant: Thomas S. Sibley, Chicago, IL (US)

(72) Inventor: Thomas S. Sibley, Chicago, IL (US)

(*) Notice: Subject to any disclaimer, the term of this patent is extended or adjusted under 35 U.S.C. 154(b) by 0 days.

(21) Appl. No.: 17/246,676

(22) Filed: May 2, 2021

(65) Prior Publication Data

US 2022/0353481 A1 Nov. 3, 2022

(51) Int. Cl.
*H04N 9/31* (2006.01)
*G03B 21/28* (2006.01)

(52) U.S. Cl.
CPC .......... *H04N 9/3197* (2013.01); *G03B 21/28* (2013.01); *H04N 9/3147* (2013.01)

(58) Field of Classification Search
CPC ........ G03B 21/00; G03B 21/14; G03B 21/28; G03B 21/56; G03B 21/145; G03B 21/208; G03B 21/562; G03B 21/602; H04N 9/3147; H04N 9/3152; H04N 9/3188; H04N 9/3197; H04N 13/279; H04N 13/341; H04N 13/383; H04N 13/395; H04N 13/398
See application file for complete search history.

(56) References Cited

U.S. PATENT DOCUMENTS

| | | | |
|---|---|---|---|
| 3,647,284 A | 3/1972 | Elings et al. | |
| 5,865,519 A | 2/1999 | Maass | |
| 6,473,115 B1 | 10/2002 | Harman | |
| 7,881,882 B2 | 2/2011 | Maxey et al. | |
| 8,485,665 B2 | 7/2013 | Redmann et al. | |
| 8,502,816 B2 | 8/2013 | Butler et al. | |
| 2006/0050421 A1 | 3/2006 | Ealey | |
| 2007/0165305 A1* | 7/2007 | Mehrle | H04N 13/31 359/464 |
| 2010/0014053 A1 | 1/2010 | Brentnall, III et al. | |
| 2010/0157021 A1 | 6/2010 | Abraham et al. | |
| 2010/0225735 A1* | 9/2010 | Shaffer | H04N 13/376 348/14.08 |
| 2011/0063575 A1 | 3/2011 | Nelson et al. | |
| 2013/0342654 A1* | 12/2013 | Nakamura | H04N 13/128 348/46 |
| 2015/0062294 A1 | 3/2015 | Sibley | |
| 2015/0312546 A1* | 10/2015 | Hasegawa | H04N 13/373 348/59 |
| 2016/0205385 A1 | 7/2016 | Sibley | |
| 2016/0246165 A1* | 8/2016 | Wang | H04N 13/305 |

OTHER PUBLICATIONS

Oliver Bimber et al., "Spatial Augmented Reality Merging Real and Virtual Worlds," CRC press, Aug. 2005, pages cover through pp. ix, 17-30, 44-66, 71-72, 83-85, 93-98, 104-108, 126-133, 174-206, 276-278, 288-291 and 302-308.

* cited by examiner

*Primary Examiner* — Sultan Chowdhury
(74) *Attorney, Agent, or Firm* — Leason Ellis LLP

(57) ABSTRACT

A system and method for the projection of virtual 3-D images onto a surface with perspective shifting viewing capability including:
- a source of data for at least two different paired left-right view sets of one subject,
- an image reflecting surface, and
- a projector capable of simultaneously projecting pairs of left-right view sets, and capable of changing projected left-right view sets of images from a first set to a second set to create a stereopsis effect in which content of a complete projected image appears to move in perspective.

12 Claims, 13 Drawing Sheets

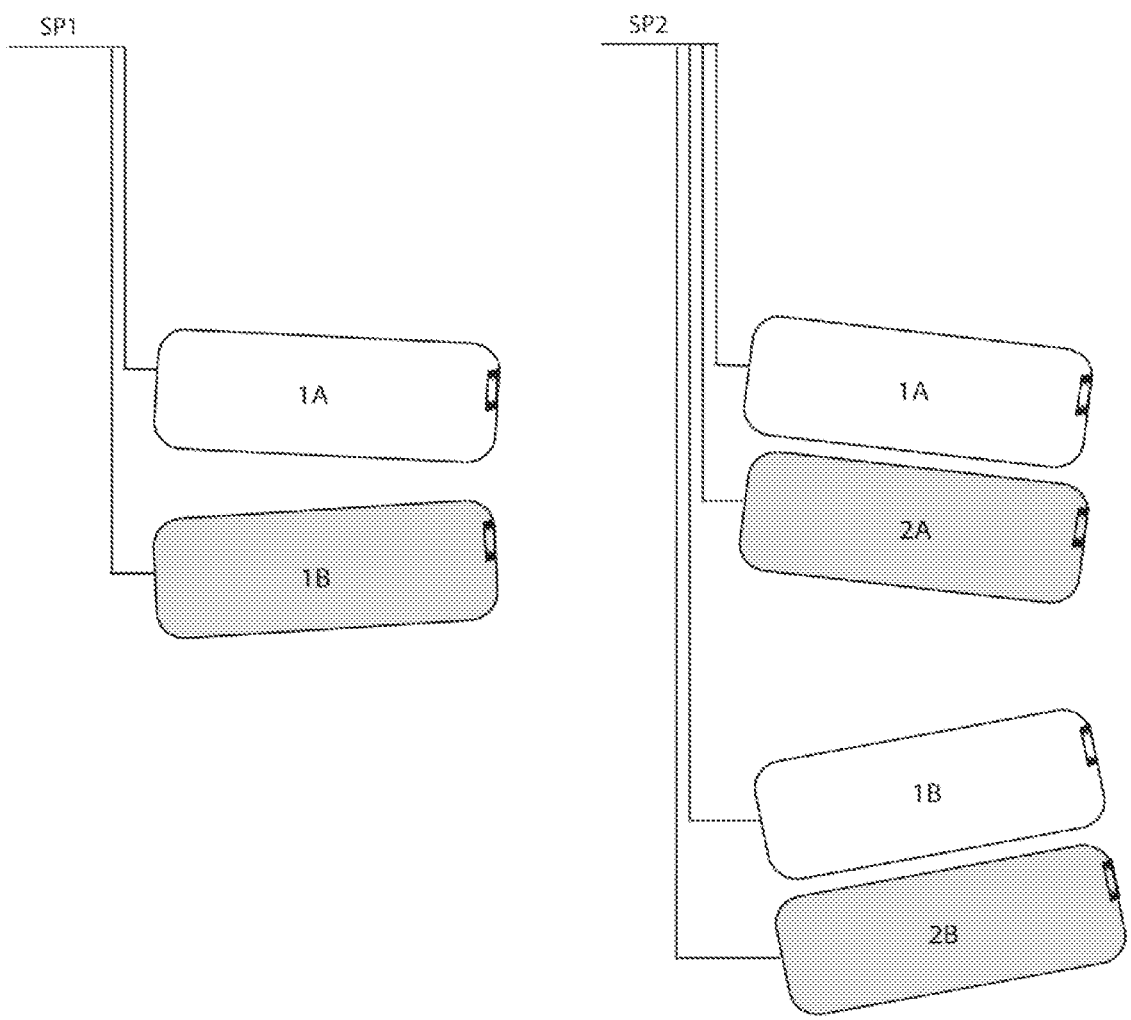

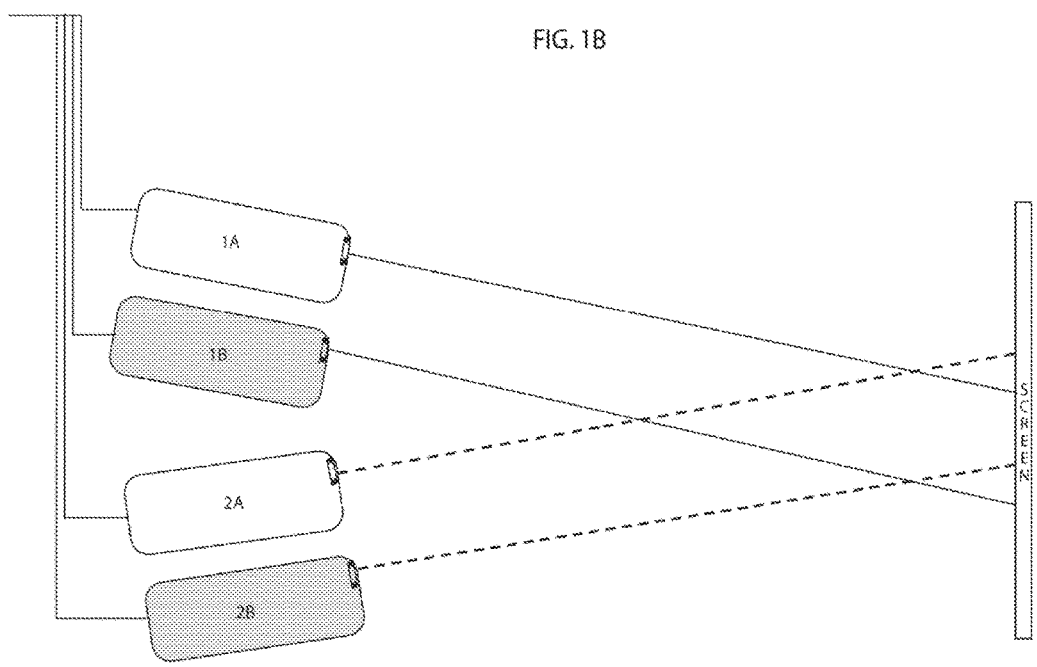
FIG. 1B
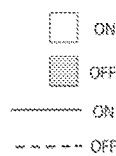

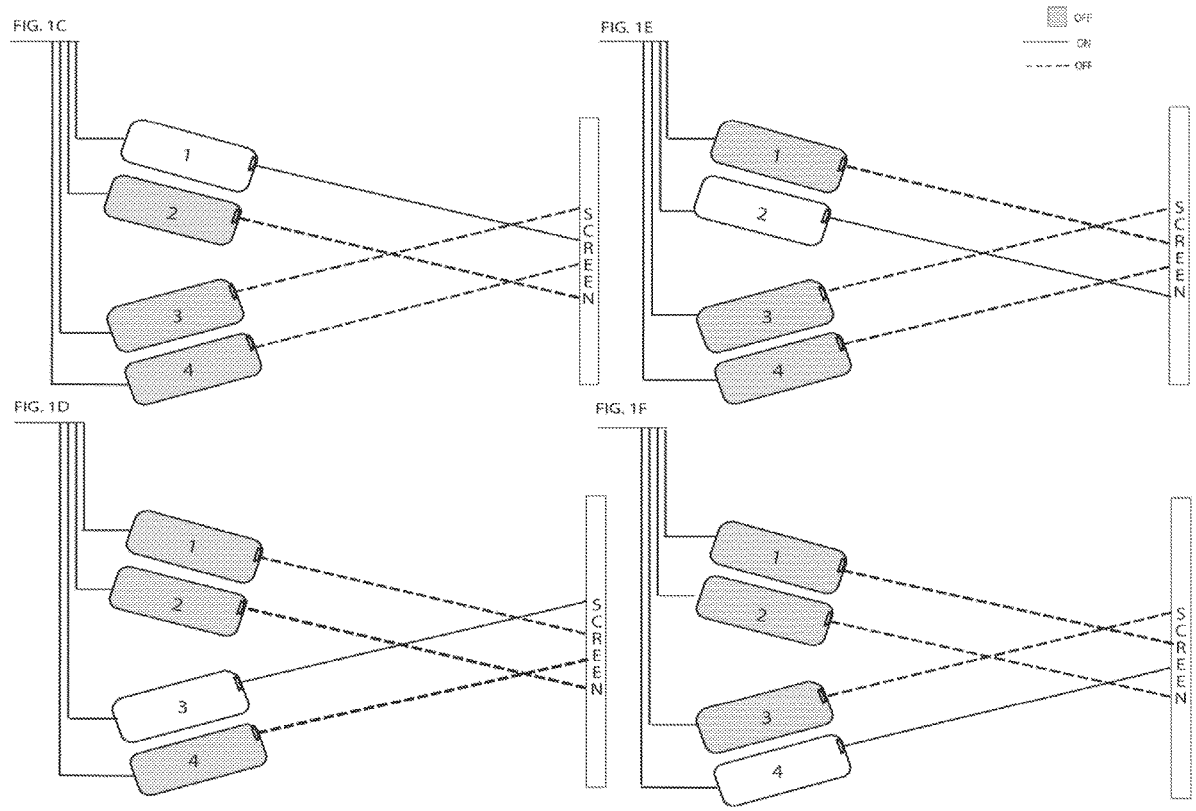

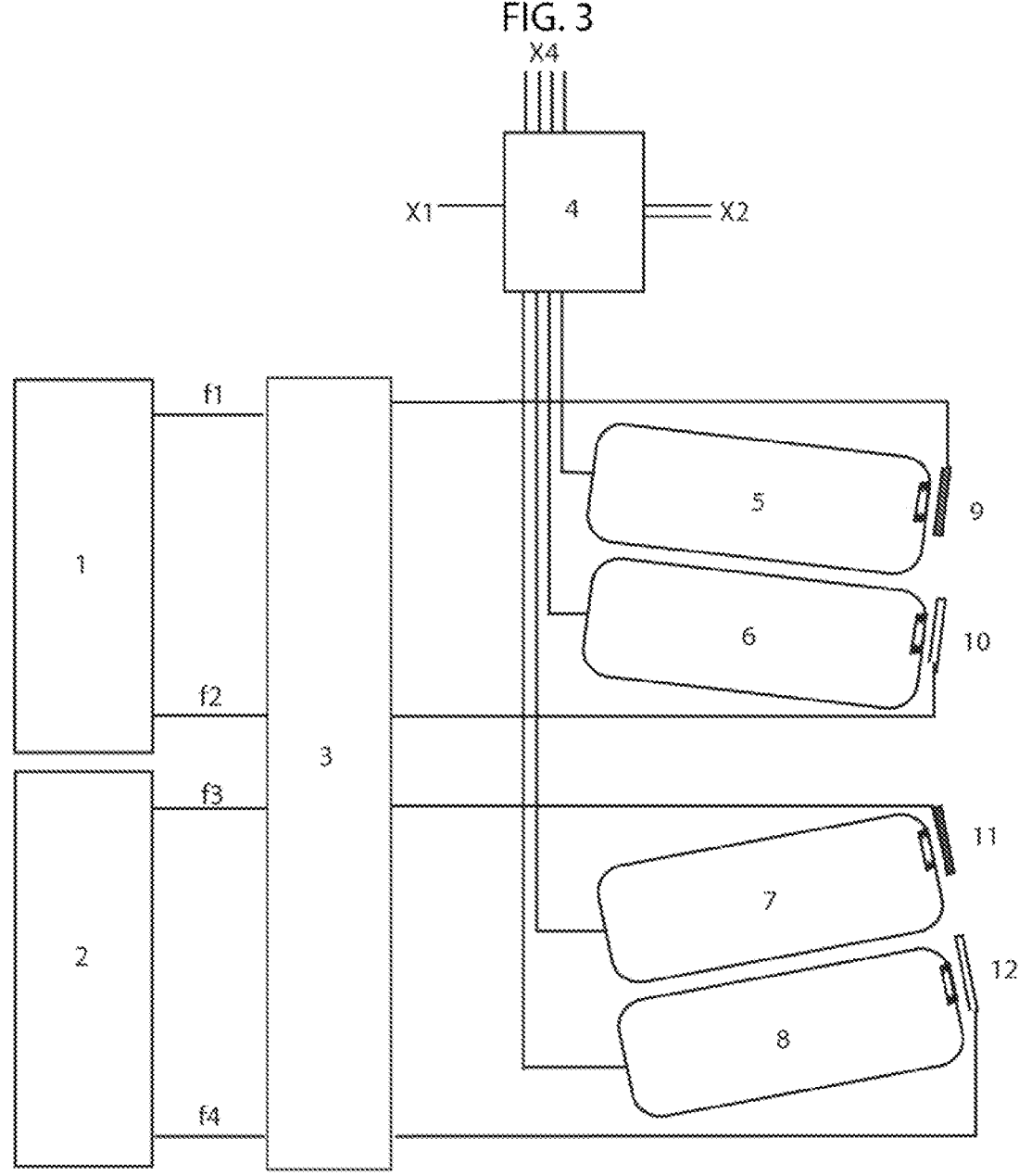

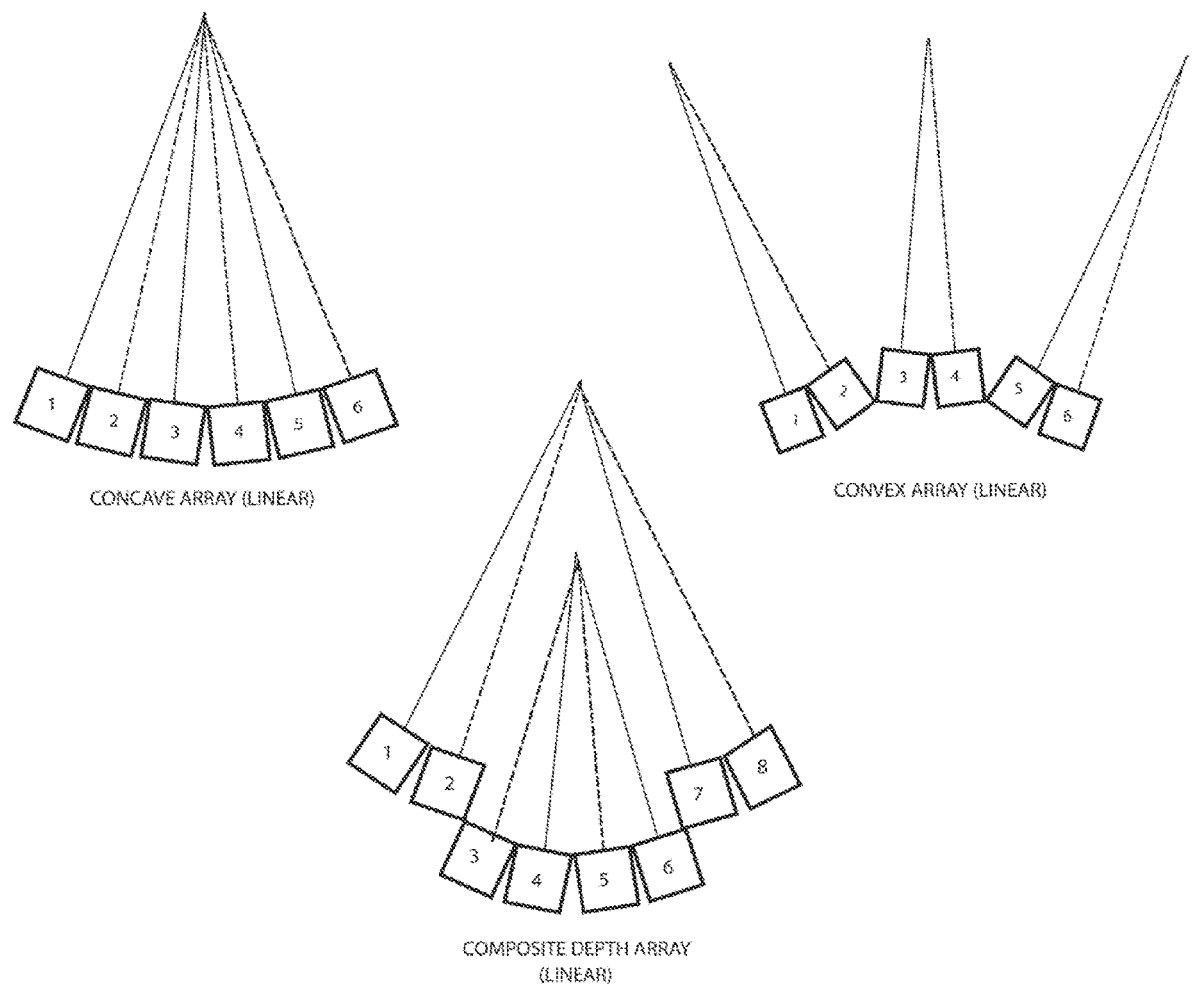

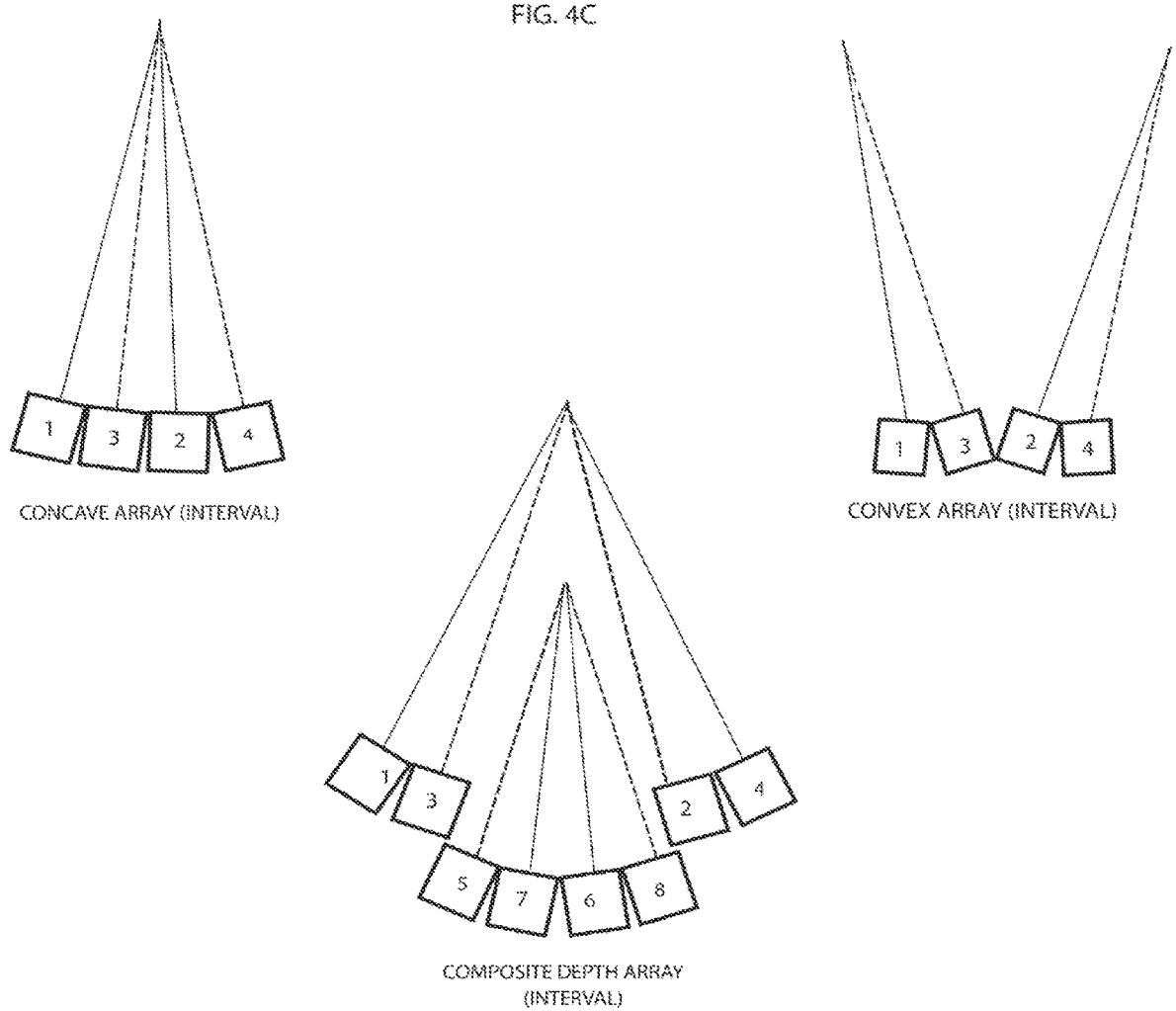

FIG. 5
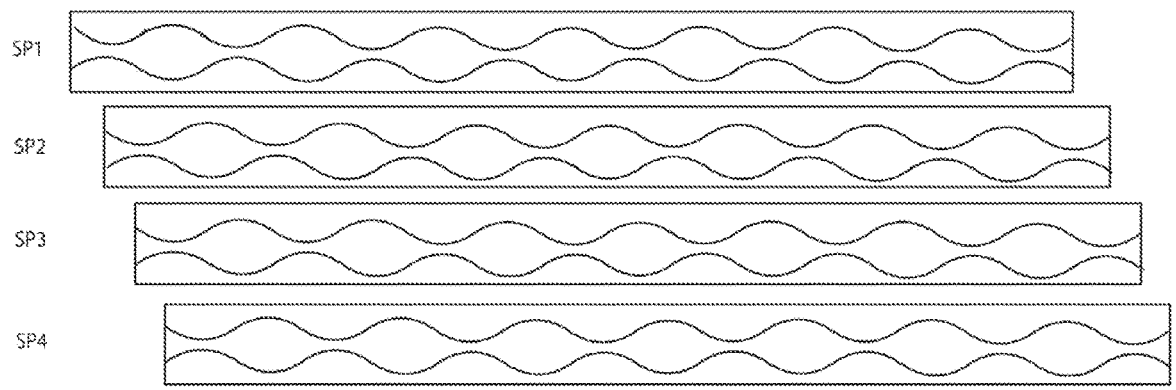
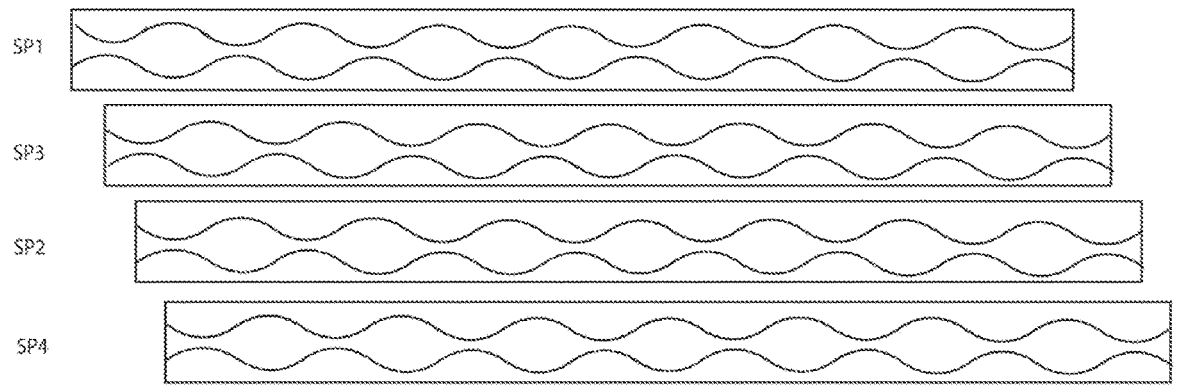

FIG. 6
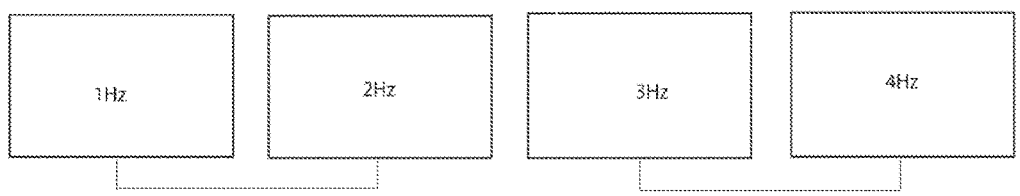
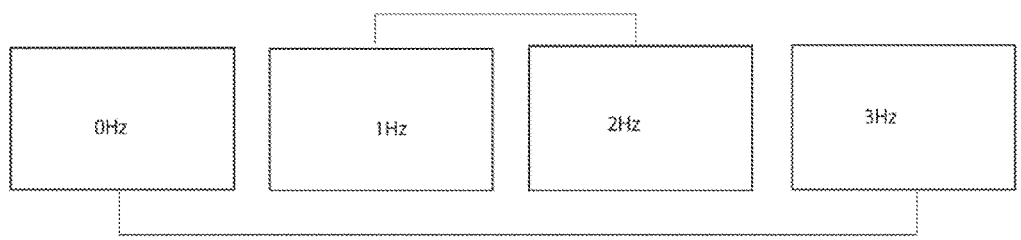
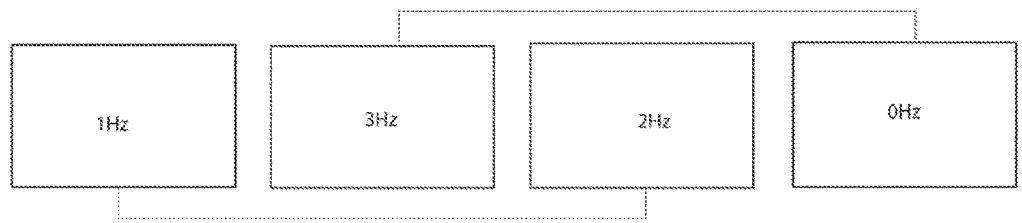

FIG. 8

RECORD MULTIPLE DIGITAL IMAGES OF STEREOSCOPIC PAIR IMAGES OF A SINGLE SUBJECT

↓

PROJECTING AT LEAST SINGLE PAIRS OF RECORDED STEREOSCOPIC PAIR IMAGES

↓

DISPLAYING SAID PROJECTED SINGLE PAIRS OF RECORDED STEREOSCOPIC IMAGES

↓

HUMAN OBSERVATION OF THE DISPLAYED SINGLE (OR MULTIPLE) PAIRS OF RECORDED STEREOSCOPIC IMAGES

↓

THE HUMAN BRAIN INTERPRETTING PROGRESSION OF IMAGES PAIRS AS MOVEMENT, INCLUDING ROTATIONAL MOVEMENT OF THE DISPLAYED SINGLE SUBJECT

PROJECTION SYSTEM AND METHOD FOR THREE-DIMENSIONAL IMAGES

RELATED APPLICATIONS DATA

None.

BACKGROUND OF THE INVENTION

1. Field of the Invention

The present invention relates to the field of three-dimensional (3D) images and particularly to 3D images that are projected and viewed without dual lens optical wear.

2. Background of the Art

Stereoscopy (also called stereoscopics, or stereo imaging) is a technique for creating or enhancing the illusion of depth or visualization of three-dimensions in an image by means of stereopsis for binocular vision. Any stereoscopic image is called a stereogram. Originally, stereogram referred to a pair of stereo images which could be viewed using a stereoscope.

Most stereoscopic methods present two offset images separately to the left and right eye of the viewer. These two-dimensional images are then combined in the brain to give the perception of 3D (3-dimensional) depth. This technique is distinguished from 3D displays that display an image in true three dimensions, allowing the observer to increase information about the 3-dimensional objects being displayed by head and eye movements.

Stereoscopy creates the illusion of three-dimensional depth from given two-dimensional images.[5] Human vision, including the perception of depth, is a complex process, which only begins with the acquisition of visual information taken in through the eyes; much processing ensues within the brain, as it strives to make sense of the raw information. One of the functions that occur within the brain as it interprets what the eyes see is assessing the relative distances of objects from the viewer, and the depth dimension of those objects. The cues that the brain uses to gauge relative distances and depth in a perceived scene include at least stereopsis, accommodation of the eye, overlapping of one object by another, subtended visual angle of an object of known size, linear perspective (convergence of parallel edges), vertical position (objects closer to the horizon in the scene tend to be perceived as farther away), haze or contrast, saturation, and color, greater distance generally being associated with greater haze, desaturation, and a shift toward blue, change in size of textured pattern detail. (All but the first two of the above cues exist in traditional two-dimensional images, such as paintings, photographs, and television.)

Stereoscopy is the production of the illusion of depth in photograph, movies or other two-dimensional image by the presentation of a slightly different image to each eye, which adds the first of these cues for stereopsis. The two images are then combined in the brain to give the perception of depth. Because all points in the image produced by stereoscopy focus at the same plane regardless of their depth in the original scene, the second cue, focus, is not duplicated and therefore the illusion of depth is incomplete. There are also mainly two effects of stereoscopy that are unnatural for human vision: (1) the mismatch between convergence and accommodation, caused by the difference between an object's perceived position in front of or behind the display or screen and the real origin of that light; and (2) possible crosstalk between the eyes, caused by imperfect image separation in some methods of stereoscopy.

Although the term "3D" is ubiquitously used, the presentation of dual 2D images is distinctly different from displaying an image in three full dimensions. The most notable difference is that, in the case of "3D" displays, the observer's head and eye movement do not change the information received about the 3-dimensional objects being viewed. Holographic displays and volumetric displays do not have this limitation. Just as it is not possible to recreate a full 3-dimensional sound field with just two stereophonic speakers, it is an overstatement to call dual 2D images "3D". The accurate term "stereoscopic" is more cumbersome than the common misnomer "3D", which has been entrenched by many decades of unquestioned misuse.

Although most stereoscopic displays do not qualify as real 3D display, all real 3D displays are also stereoscopic displays because they meet the lower criteria also.

Most 3D displays use this stereoscopic method to convey images. Original stereopsis on stereopticons used drawings because photography was not yet available, yet these early paper images foresaw the development of a realistic imaging method.

Stereoscopy is used in photogrammetry and also for entertainment through the production of stereograms. Stereoscopy is useful in viewing images rendered from large multi-dimensional data sets such as are produced by experimental data.

Modem industrial three-dimensional photography may use 3D scanners to detect and record three-dimensional information. The three-dimensional depth information can be reconstructed from two images using a computer by correlating the pixels in the left and right images. Solving the Correspondence problem in the field of Computer Vision aims to create meaningful depth information from two images.

Visual requirements—Anatomically, there are 3 levels of binocular vision required to view stereo images:
1. Simultaneous perception
2. Fusion (binocular 'single' vision)
3. Stereopsis These functions develop in early childhood.

Stereoscopic viewing may be artificially created by the viewer's brain, as demonstrated with the Van Hare Effect, where the brain perceives stereo images even when the paired photographs are identical. This "false dimensionality" results from the developed stereoacuity in the brain, allowing the viewer to fill in depth information even when few if any 3D cues are actually available in the paired images.

There are two general categories of 3D viewer technology, active and passive. Active viewers have electronics which interact with a display. Passive viewers filter constant streams of binocular input to the appropriate eye.

Active—e.g., Shutter systems. Functional principle of active shutter 3D systems

A shutter system works by openly presenting the image intended for the left eye while blocking the right eye's view, then presenting the right-eye image while blocking the left eye, and repeating this so rapidly that the interruptions do not interfere with the perceived fusion of the two images into a single 3D image. It generally uses liquid crystal shutter glasses. Each eye's glass contains a liquid crystal layer which has the property of becoming dark when voltage is applied, being otherwise transparent. The glasses are controlled by a timing signal that allows the glasses to alternately darken over one eye, and then the other, in synchronization with the refresh rate of the screen. The main drawback of active shutters is that most 3D videos and movies were shot with simultaneous left and right views, so that it introduces a "time parallax" for anything side-moving: for instance, someone walking at 3.4 mph will be seen 20% too close or 25% too remote in the most current case of a 2×60 Hz projection.

Passive—Polarization systems. Functional principle of polarized 3D systems.

To present stereoscopic pictures, two images are projected superimposed onto the same screen through polarizing filters or presented on a display with polarized filters. For projection, a silver screen is used so that polarization is preserved. On most passive displays every other row of pixels is polarized exclusively for one eye or the other. This method is also known as being interlaced. The viewer wears low-cost eyeglasses which also contain a pair of opposite polarizing filters. As each filter only passes light which is similarly polarized and blocks the opposite polarized light, each eye only sees one of the images, and the effect is achieved.

Interference filter systems—This technology uses specific wavelengths of red, green, and blue for the right eye, and different wavelengths of red, green, and blue for the left eye. Eyeglasses which filter out the very specific wavelengths allow the wearer to see a full color 3D image. It is also known as spectral comb filtering or wavelength multiplex visualization or super-anaglyph. Dolby 3D uses this principle. The Omega 3D/Panavision 3D system has also used an improved version of this technology.

Anaglyph 3D is the name given to the stereoscopic 3D effect achieved by means of encoding each eye's image using filters of different (usually chromatically opposite) colors, typically red and cyan. Red-cyan filters can be used because our vision processing systems use red and cyan comparisons, as well as blue and yellow, to determine the color and contours of objects. Anaglyph 3D images contain two differently filtered colored images, one for each eye. When viewed through the "color-coded" "anaglyph glasses", each of the two images reaches one eye, revealing an integrated stereoscopic image. The visual cortex of the brain fuses this into perception of a three-dimensional scene or composition.

Chromadepth® 3D System

ChromaDepth® glasses with prism-like film is based on the fact that with a prism, colors are separated by varying degrees. The ChromaDepth® eyeglasses contain special view foils, which consist of microscopically small prisms. This causes the image to be translated a certain amount that depends on its color. If one uses a prism foil now with one eye but not on the other eye, then the two seen pictures—depending upon color—are more or less widely separated. The brain produces the spatial impression from this difference. The advantage of this technology consists above all of the fact that one can regard ChromaDepth® pictures also without eyeglasses (thus two-dimensional) problem-free (unlike with two-color anaglyph). However, the colors are only limitedly selectable, since they contain the depth information of the picture. If one changes the color of an object, then its observed distance will also be changed.

The KMQ stereo prismatic viewer with open KMQ plastics extensions use the Pulfrich effect which is based on the phenomenon of the human eye processing images more slowly when there is less light, as when looking through a dark lens. Because the Pulfrich effect depends on motion in a particular direction to instigate the illusion of depth, it is not useful as a general stereoscopic technique. For example, it cannot be used to show a stationary object apparently extending into or out of the screen; similarly, objects moving vertically will not be seen as moving in depth. Incidental movement of objects will create spurious artifacts, and these incidental effects will be seen as artificial depth not related to actual depth in the scene.

Over/under format—Stereoscopic viewing is achieved by placing an image pair one above one another. Special viewers are made for over/under format that tilt the right eyesight slightly up and the left eyesight slightly down. The most common one with mirrors is the View Magic. Another with prismatic glasses is the KMQ viewer. A recent usage of this technique is the open KMQ project.

Other display methods without viewers include Autostereoscopy which uses parallax barrier autostereoscopy to display a 3D image. Autostereoscopic display technologies use optical components in the display, rather than worn by the user, to enable each eye to see a different image. Because headgear is not required, it is also called "glasses-free 3D". The optics split the images directionally into the viewer's eyes, so the display viewing geometry requires limited head positions that will achieve the stereoscopic effect. Automultiscopic displays provide multiple views of the same scene, rather than just two. Each view is visible from a different range of positions in front of the display. This allows the viewer to move left-right in front of the display and see the correct view from any position. The technology includes two broad classes of displays: those that use head-tracking to ensure that each of the viewer's two eyes sees a different image on the screen, and those that display multiple views so that the display does not need to know where the viewers' eyes are directed. Examples of autostereoscopic displays technology include lenticular lens, parallax barrier, volumetric display, holography and light field displays.

Holography, in its original "pure" form of the photographic transmission hologram, is the only technology yet created which can reproduce an object or scene with such complete realism that the reproduction is visually indistinguishable from the original, given the original lighting conditions. It creates a light field identical to that which emanated from the original scene, with parallax about all axes and a very wide viewing angle. The eye differentially focuses objects at different distances and subject detail is preserved down to the microscopic level. The effect is exactly like looking through a window. Unfortunately, this pure form requires the subject to be laser-lit and completely motionless—to within a minor fraction of the wavelength of light-during the photographic exposure, and laser light must be used to properly view the results. Most people have never seen a laser-lit transmission hologram. The types of holograms commonly encountered have seriously compromised image quality so that ordinary white light can be used for viewing, and non-holographic intermediate imaging processes are almost always resorted to, as an alternative to using powerful and hazardous pulsed lasers, when living subjects are photographed.

Although the original photographic processes have proven impractical for general use, the combination of computer-generated holograms (CGH) and optoelectronic holographic displays, both under development for many years, has the potential to transform the half-century-old pipe dream of holographic 3D television into a reality; so far, however, the large amount of calculation required to generate just one detailed hologram, and the huge bandwidth required to transmit a stream of them, have confined this technology to the research laboratory.

Volumetric displays—Volumetric displays use some physical mechanism to display points of light within a volume. Such displays use voxels instead of pixels. Volumetric displays include multiplanar displays, which have multiple display planes stacked up, and rotating panel displays, where a rotating panel sweeps out a volume.

Other technologies have been developed to project light dots in the air above a device. An infrared laser is focused on the destination in space, generating a small bubble of plasma which emits visible light.

Integral imaging—Integral imaging is a technique for producing 3D displays which are both autostereoscopic and multiscopic, meaning that the 3D image is viewed without the use of special glasses and different aspects are seen when it is viewed from positions that differ either horizontally or vertically. This is achieved by using an array of microlenses (akin to a lenticular lens, but an X-Y or "fly's eye" array in which each lenslet typically forms its own image of the scene without assistance from a larger objective lens) or pinholes to capture and display the scene as a 4D light field, producing stereoscopic images that exhibit realistic alterations of parallax and perspective when the viewer moves left, right, up, down, closer, or farther away.

Wiggle stereoscopy—Wiggle stereoscopy is an image display technique achieved by quickly alternating display of left and right sides of a stereogram. This may be found in animated GIF format on the web.

Stereo photography techniques—Modem stereo TV camera. For general purpose stereo photography, where the goal is to duplicate natural human vision and give a visual impression as close as possible to actually being there, the correct baseline (distance between where the right and left images are taken) would be the same as the distance between the eyes. When images taken with such a baseline are viewed using a viewing method that duplicates the conditions under which the picture is taken, then the result would be an image much the same as that which would be seen at the site the photo was taken. This could be described as "ortho stereo." However, there are situations in which it might be desirable to use a longer or shorter baseline. The factors to consider include the viewing method to be used and the goal in taking the picture. The concept of baseline also applies to other branches of stereography, such as stereo drawings and computer-generated stereo images, but it involves the point of view chosen rather than actual physical separation of cameras or lenses.

Stereo window—The concept of the stereo window is important, since the window is the stereoscopic image of the external boundaries of left and right views constituting the stereoscopic image. If any object, which is cut off by lateral sides of the window, is placed in front of it, an effect results that is unnatural and is undesirable, this is called a "window violation". This can best be understood by returning to the analogy of an actual physical window. Therefore, there is a contradiction between two different depth cues: some elements of the image are hidden by the window, so that the window appears as closer than these elements, and the same elements of the image appear as closer than the window. So that the stereo window must always be adjusted to avoid window violations. Some objects can be seen in front of the window, as far as they don't reach the lateral sides of the window. But these objects cannot be seen as too close, since there is always a limit of the parallax range for comfortable viewing. If a scene is viewed through a window the entire scene would normally be behind the window, if the scene is distant, it would be some distance behind the window, if it is nearby, it would appear to be just beyond the window. An object smaller than the window itself could even go through the window and appear partially or completely in front of it. The same applies to a part of a larger object that is smaller than the window. The goal of setting the stereo window is to duplicate this effect.

Therefore, the location of the window versus the whole of the image must be adjusted so that most of the image is seen beyond the window. In the case of viewing on a 3D TV set, it is easier to place the window in front of the image, and to let the window in the plane of the screen.

On the contrary, in the case of projection on a much larger screen, it is much better to set the window in front of the screen (it is called "floating window"), for instance so that it is viewed about two meters away by the viewers sit in the first row. Therefore, these people will normally see the background of the image at the infinite. Of course, the viewers seated beyond will see the window more remote, but if the image is made in normal conditions, so that the first row viewers see this background at the infinite, the other viewers, seated behind, will also see this background at the infinite, since the parallax of this background is equal to the average human interocular.

The entire scene, including the window, can be moved backwards or forwards in depth, by horizontally sliding the left and right eye views relative to each other. Moving either or both images away from the center will bring the whole scene away from the viewer, whereas moving either or both images toward the center will move the whole scene toward the viewer. This is possible, for instance, if two projectors are used for this projection.

In stereo photography window adjustments is accomplished by shifting/cropping the images, in other forms of stereoscopy such as drawings and computer-generated images the window is built into the design of the images as they are generated.

The images can be cropped creatively to create a stereo window that is not necessarily rectangular or lying on a flat plane perpendicular to the viewer's line of sight. The edges of the stereo frame can be straight or curved and, when viewed in 3D, can flow toward or away from the viewer and through the scene. These designed stereo frames can help emphasize certain elements in the stereo image or can be an artistic component of the stereo image.

While stereoscopic images have typically been used for amusement, including stereographic cards, 3D films, 3D television, stereoscopic video games, printings using anglyph and pictures, posters and books of autostereograms, there are also other uses of this technology. These include art, education, space exploration (as with the Mars exploration rovers, clinical uses such as vectographs used by ophthamologists, and mathematical, scientific and engineering uses.

Stereopair photographs provided a way for 3-dimensional (3D) visualisations of aerial photographs; since about 2000. 3D aerial views are mainly based on digital stereo imaging technologies. One issue related to stereo images is the amount of disk space needed to save such files. Indeed, a stereo image usually requires twice as much space as a normal image. In biology and chemistry, complex molecular structures are often rendered in stereopairs. The same technique can also be applied to any mathematical (or scientific, or engineering) parameter that is a function of two variables, although in these cases it is more common for a three-dimensional effect to be created using a 'distorted' mesh or shading (as if from a distant light source).

A 3D projection (or graphical projection) is a design technique used to display a three-dimensional (3D) object on a two-dimensional (2D) surface. These projections rely on visual perspective and aspect analysis to project a complex object for viewing capability on a simpler plane.

3D projections use the primary qualities of an object's basic shape to create a map of points, that are then connected to one another to create a visual element. The result is a graphic that contains conceptual properties to interpret that the figure or image is not actually flat (2D), but rather, is a solid object (3D) being viewed on a 2D display.

3D objects are largely displayed on two-dimensional mediums (i.e., paper and computer monitors). As such, graphical projections are a commonly used design element; notably, in engineering drawing, drafting and computer graphics. Projections can be calculated through employment of mathematical analysis and formulae, or by using various geometric and optical techniques.

Parallel projection—Parallel projection corresponds to a perspective projection with a hypothetical viewpoint; i.e. one where the camera lies an infinite distance away from the object and has an infinite focal length, or "zoom". In parallel projection, the lines of sight from the object to the projection plane are parallel to each other. Thus, lines that are parallel in three-dimensional space remain parallel in the two-dimensional projected image. Parallel projection also corresponds to a perspective with an infinite focal length (the distance from a camera's lens and focal points or zoom.

Images drawn in parallel projection rely upon the technique of axonometry ("to measure along axes"), as described in Pohlke's theorem. In general, the resulting image is oblique (the rays are not perpendicular to the image plane); but in special cases the result is orthographic (the rays are perpendicular to the image plane). Axonometry should not be confused with axonometric projection, as in English literature the latter usually refers only to a specific class of pictorials (see below).

The Orthographic projection is derived from the principles of descriptive geometry and is a two-dimensional representation of a three-dimensional object. It is a parallel projection (the lines of projection are parallel both in reality and in the projection plane). It is the projection type of choice for working drawings.

If the normal of the viewing plane (the camera direction) is parallel to one of the primary axes (which is the x, y, or z axis), and the data are mathematically transformed projecting 3D points onto 2D points. While orthographically projected images represent the three-dimensional nature of the object projected, they do not represent the object as it would be recorded photographically or perceived by a viewer observing it directly. In particular, parallel lengths at all points in an orthographically projected image are of the same scale regardless of whether they are far away or near to the virtual viewer. As a result, lengths are not foreshortened as they would be in a perspective projection.

Multiview projection has symbols used to define whether a multiview projection is either Third Angle (right) or First Angle (left).

With multiview projections, up to six pictures (called primary views) of an object are produced, with each projection plane parallel to one of the coordinate axes of the object. The views are positioned relative to each other according to either of two schemes:first-angle or third-angle projection. In each, the appearances of views may be thought of as being projected onto planes that form a 6-sided box around the object. Although six different sides can be drawn, usually three views of a drawing give enough information to make a 3D object. These views are known as front view, top view, and end view. The terms elevation, plan and section are also used.

Axonometric projection—Within orthographic projection there is an ancillary category known as orthographic pictorial or axonometric projection. Axonometric projections show an image of an object as viewed from a skew direction in order to reveal all three directions (axes) of space in one picture. Axonometric instrument drawings are often used to approximate graphical perspective projections, but there is attendant distortion in the approximation. Because pictorial projections innately contain this distortion, in instrument drawings of pictorials great liberties may then be taken for economy of effort and best effect. Axonometric projection is further subdivided into three categories: isometric projection, dimetric projection, and trimetric projection, depending on the exact angle at which the view deviates from the orthogonal. A typical characteristic of orthographic pictorials is that one axis of space is usually displayed as vertical.

SUMMARY OF THE INVENTION

A system for the projection of virtual 3-D images onto a surface with perspective shifting viewing capability comprising:
a source of data for at least two different paired left-right (which includes up-down) view sets of one subject, an image reflecting surface, a projector capable of simultaneously projecting (this includes stepped progression of image half sets) individual pairs of left-right view sets, and changing projected individual pairs of the left-right view sets of images from a first set to a second set to create a stereopsis effect in which content of a complete projected image appears to move in perspective. It is preferred that there are at least three sets of paired left-right view sets of the single subject and more preferably there are least four sets of paired left-right view sets, and the system is configured to display each view set in a progressive order from relatively left-most or right-most set through the at least four view sets to the right-most or left-most view set, respectively to provide a rotating view of the one subject.

BRIEF DESCRIPTION OF THE FIGURES

FIG. 1 shows a multiscope projector-based single and dual parallax mode with one and two stereo pairs.

FIG. 1B shows three more complex variations of multiscope linear stereo pair arrays.

FIG. 1C shows a first emitter projecting in a two-pair emitter system, which is a more complex multiscope non-linear stereo pair arrays.

FIG. 1D shows a second emitter projecting in a two-pair emitter system in the more complex multiscope non-linear stereo pair arrays of FIG. 1C.

FIG. 1E shows a third emitter projecting in a two-pair emitter system in the more complex multiscope non-linear stereo pair arrays of FIG. 1C.

FIG. 1F shows a fourthsecond emitter projecting in a two-pair emitter system in the more complex multiscope non-linear stereo pair arrays of FIG. 1C.

FIG. 3 shows an LCD shutter-based, dual parallax mode multiscope, with two stereo pairs.

FIG. 4B shows MULTISCOPE: LINEAR STEREO PAIR ARRAYS.

FIG. 4C shows MULTISCOPE: NON-LINEAR STEREO PAIR ARRAYS.

FIG. 5 shows a Multiscope, Stepped Sine Wave Modulation and an alternative Multiscope, Stepped Sine Wave Modulation.

FIG. 6 shows a series of multiscope examples of stereo pair/shutter frequency combinations.

FIG. 8 shows a flow diagram of one generic series of steps useful in the practice of the present invention.

DETAILED DESCRIPTION OF THE INVENTION

Figure 1A:
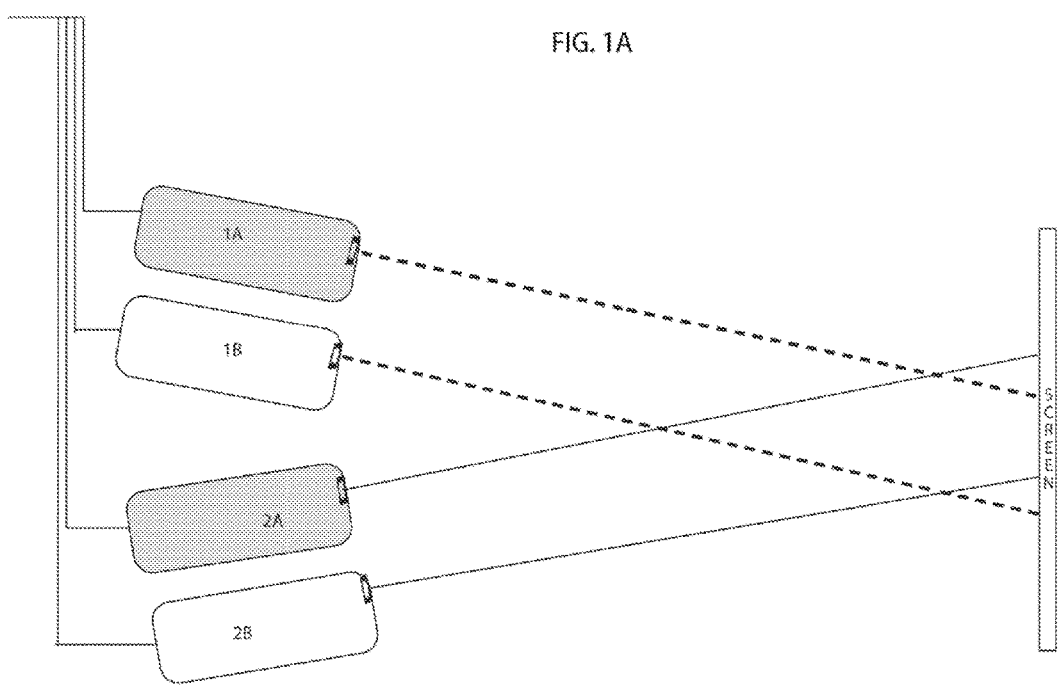
FIG. 1A shows three simple variations of multiscope stereo pair array in a first configuration.

A system for the projection of virtual 3-D images onto a surface with perspective shifting viewing capability comprising:
a source of data for at least two different paired left-right (which includes up-down) view sets of one subject, an image reflecting surface, a projector capable of simultaneously projecting (this includes stepped progression of image half sets) individual pairs of left-right view sets, and changing projected individual pairs of the left-right view sets of images from a first set to a second set to create a stereopsis effect in which content of a complete projected image appears to move in perspective. It is preferred that there are at least three sets of paired left-right view sets of the single subject and more preferably there are least four sets of paired left-right view sets, and the system is configured to display each view set in a progressive order from relatively left-most or right-most set through the at least four view sets to the right-most or left-most view set, respectively to provide a rotating view of the one subject.

Only one pair of image sets (left-right, which is inclusive of up-down pairs) at a time is displayed (projected), and minimizing persistence in projection of past pairs or half pairs is important in providing sharp and clear progression of the images as they shift or virtually move. It is also contemplated to provide movement (besides or in addition to virtual rotation viewing) by having stepped movement of the subject matter progressively and respectively paired with the rotational viewing. For example, in a stream of 100 pair sets of a hummingbird, the first fifty will step-wise have wings moving upwardly, and the second fifty images will have the wings moving step-wise downwardly. Combined with step-wise rotation about the hummingbird, the display can provide both rotational 3D and active movement of the subject, in this case the hummingbird slapping its wings.

The method of the invention may take advantage of the flicker fusion threshold, or flicker fusion rate, a concept in the psychophysics of vision. It is defined as the frequency at which an intermittent light stimulus appears to be completely steady to the average human observer. Flicker fusion threshold is related to persistence of vision. Although flicker can be detected for many waveforms representing time-variant fluctuations of intensity, it is conventionally, and most easily, studied in terms of sinusoidal modulation of intensity. There are seven parameters that determine the ability to detect the flicker:
1. the frequency of the modulation;
2. the amplitude or depth of the modulation (i.e., what is the maximum percent decrease in the illumination intensity from its peak value);
3. the average (or maximum—these can be inter-converted if modulation depth is known) illumination intensity;
4. the wavelength (or wavelength range) of the illumination (this parameter and the illumination intensity can be combined into a single parameter for humans or other animals for which the sensitivities of rods and cones are known as a function of wavelength using the luminous flux function);
5. the position on the retina at which the stimulation occurs (due to the different distribution of photoreceptor types at different positions);
6. the degree of light or dark adaptation, i.e., the duration and intensity of previous exposure to background light, which affects both the intensity sensitivity and the time resolution of vision;
7. physiological factors such as age and fatigue.

Although images in the present technology are provided with continuous projection of each image pair set (without actual flickering), in the transition between pair sets, consideration of this phenomenon becomes visually important. Flicker fusion is important in all technologies for presenting moving images, nearly all of which depend on presenting a rapid succession of static images (e.g., the frames in a cinema film, TV show, or a digital video file). If the frame rate falls below the flicker fusion threshold for the given viewing conditions, flicker will be apparent to the observer, and movements of objects on the film will appear jerky. For the purposes of presenting moving images, the human flicker fusion threshold is usually taken between 60 and 90 Hz, though in certain cases it can be higher by an order of magnitude.[5] In practice, movies are recorded at 24 frames per second and displayed by repeating each frame two or three times for a flicker of 48 or 72 Hz. Standard-definition television operates at 25 or 30 frames per second, or sometimes at 50 or 60 (half-)frames per second through interlacing. High-definition video is displayed at 24, 25, 30, 60 frames per second or higher.

The flicker fusion threshold does not prevent indirect detection of a high frame rate, such as the phantom array effect or wagon-wheel effect, as human-visible side effects of a finite frame rate were still seen on an experimental 480 Hz display.

Stereo pair groupings can be arranged in variously configured arrays, the three primary pairs of which are illustrated in FIG. 1A and shall be discussed here:
1. Concave array: wherein all projector stereo pairs are all pointed inwards converging on a slightly offset focal point. Stereo pairs are arranged following the 180 degrees arc so that all projectors focus upon one specified area sequenced in a predetermined order.
2. Convex array: wherein multiple projector stereo pairs are all pointed outwards, producing a panoramic, continuous, or immersive environment of up to 360 degrees sequenced in a predetermined order.
3. Composite depth array: wherein multiple, stereo pairs project foreground and background information using shuttered or switched stereoscopic information at multiple focal points sequenced in a predetermined order. Projectors or shutters can switch between right foreground/left background/left foreground, right background in a linear or non-linear order. Projectors can also be staged at varying distances to produce a similar effect.

The purpose of multiplying the shutter or projector stereo pairs as arrays (4, 6, 8 +) is to stabilize the image through the use of additional perspective angles. This eliminates the jarring quality of the wiggle stereoscopic effect as is evidenced by the stabilizing influence of additional angles in the GIF form. The addition of sufficient intermediary angles between left and right perspectives allows for decreased visibility of the stereo wiggle due to a multi-frame Left to Right or Right to Left stereo pairs. Multiple stereo pairs are arrayed in such a way as to smooth visual distortion while preserving the Van Hare effect upon the brain.

These sequences of cascading frames exceed the persistence of vision by overlapping slightly offset focal points through linear, non-linear, and/or composite depth pairs methods.

FIG. 1B/the Linear Pair Method exists where stereo pairs are sequenced in consecutive order. They are sequenced using stepped sine wave, stereo pairs in layers that overlap one another in a linear, cascading order such that each subsequent sine wave is stepped a quarter cycle in the case of four shutters, or eights in in the case of eights, ad infinitum. The sine wave arrangement is much like separate audio tracks in a sound project or musical notes on a score. These stepped, sine wave, stereo pairs are sequenced to trigger the LCD shutter panels in ordered succession and can be reordered to triggered different patterns where other sequence methods apply.

The linear pair method can be sequenced using stepped sine waves in layers that overlap one another in such a way that each subsequent sine wave is stepped a quarter cycle in the case of four shutter or eighths in the case of eight, ad infinitum.

FIG. 1C/the Non-Linear Method exists where stereo pair 1 and 2 are arranged in intervals with 3 and 4, which works to make the transition between subsequent stereo pairs less noticeable and as such provides an additional layer of stabilization.

FIGS. 1B & 1C—the Composite Depth Method exists where stereo pair combinations allow for separate background and foreground information to be projected by alternating between stereo pairs at multiple depths. This can exist in both a linear and non-linear form. The Composite Depth Method creates compound depth, increasing depth, and informational complexity.

Timing circuits and microprocessors can also trigger and order these sequences in the array. Currently the sinewaves are cycled at low frequencies and slow speeds between 1 and 10 HZ which creates the wiggle stereoscopy illusion and induces the Van Hare effect in the viewer.

The stereo pairs consist of sine waves in opposite phases of positive and negative polarity. Stereo pairs can be sequenced as linear pairs, non-linear pairs, or composite depth pairs. Shutters and projectors can be sequenced by other types of timing circuits, microprocessors, EPROMs, or EPROM emulators. Other control methods can be used to a similar effect which should be obvious to those familiar with the art.

Signals are not limited to sine waves as square, triangle, other waveforms can also trigger the LCD shutter panels and various type waveforms can be used in conjunction to modulate the LCD shutter panels. AC and DC modulation can be used, however, 14 volts AC appears to be the most functional voltage for the LCD shutter panels and completely blocks all transmissive light. Projectors are best arranged in stereo pairs on a level horizontal plane and aimed inward at varying degrees on a 180 degree arc relative to focal point, desired scale, offset distance, and sequencing method.

In the execution of the present technology. The shift-time, with by way of a non-limiting example, of less than 0.08 seconds overlap of pair sets, also must be in less than 0.08 seconds. For high resolution images, the shift time or shutter speed must be less than 0.04 seconds, and preferably less than 0.03 seconds as the time within which the first pair set image disappears and is replaced by the second pair set image of the same single subject image.

Images may overlap, and also may vary in intensity for special visual effects, both when stationary, moving or wobbling.

Shutters

As disclosed in U.S. Pat. No. 9,344,647 (Agranov), it is evidenced that an imaging system may include an image sensor having an array of image pixels. Each image pixel may include an electronic shutter for controlling when a photosensor in the image pixel accumulates charge. The electronic shutter may be operable in an open state during which charge is allowed to accumulate on the photosensor and a closed state during which charge is drained from the photosensor. The electronic shutter may be cycled through multiple open and closed states during an image frame capture. At the end of each open state, the charge that has been acquired on the photosensor may be transferred from the photosensor to a pixel memory element. By breaking up the total exposure time for a pixel during an image frame into shorter, non-continuous periods of exposure time, dynamic scenery image artifacts may be minimized while maintaining the desired total exposure time.

Because charge is allowed to accumulate on photodiode 20 when signal SG is deasserted (i.e., when SG is low), the OFF state of transistor may correspond to an open electronic shutter for a pixel. Similarly, because photodiode is reset to power supply voltage $V_{ab}$ when signal SG is asserted (i.e., when SG is high), the ON state of transistor may correspond to a closed electronic shutter for pixel 30. In general, an "open" electronic shutter may be used herein to refer to the state in which photodiode is allowed to accumulate charge (i.e., the state in which transistor is deasserted), whereas a "closed" electronic shutter may be used herein to refer to the state in which photodiode is reset to power supply voltage $V_{ab}$ (i.e., the state in which transistor is asserted).

Pixel may include a transfer gate (transistor). Transfer gate 38 may have a gate terminal that is controlled by transfer control signal TX. Transfer signal TX may be pulsed to transfer charge from photodiode to charge storage region. Floating diffusion region may be a doped semiconductor region (e.g., a region in a silicon substrate that is doped by ion implantation, impurity diffusion, or other doping process).

If desired, pixel may have additional storage regions for temporarily storing charge transferred from photodiode. For example, an intermediate memory node such as a diffused diode and intermediate transfer gate or any other suitable in-pixel memory configuration may be located between transfer transistor 38 and source follower transistor.

A pixel may include readout circuitry such as charge readout circuitry. Charge readout circuit may include row-select transistor and source-follower transistor 40. Transistor may have a gate that is controlled by row select signal RS. When signal RS is asserted, the transistor is turned on and a corresponding signal $V_t$ (e.g., an output signal having a magnitude that is proportional to the amount of charge at floating diffusion node), is passed onto output path.

A shutter gate may be pulsed dynamically during a frame capture. Each cycle of dynamic shutter operation may include a period of time when the shutter is open (i.e., when SG is low) and a period of time when shutter is closed (i.e., when SG is high). When the shutter is closed, charge is drained from pixel and discarded. When shutter is open, charge is acquired on photodiode. At the end of each cycle, transfer gate TX may be pulsed to transfer charge that has accumulated on photodiode during the cycle to charge storage region.

In a typical image pixel array configuration, there are numerous rows and columns of pixels. A column readout path such as output line may be associated with each column of pixels (e.g., each image pixel in a column may be coupled to output line through an associated row-select transistor). Signal RS may be asserted to read out signal Vout from a selected image pixel onto column readout path. Image data Vout may be fed to processing circuitry for further processing. The circuitry described is merely illustrative. If desired, pixel may include other pixel circuitry.

Figure 2:
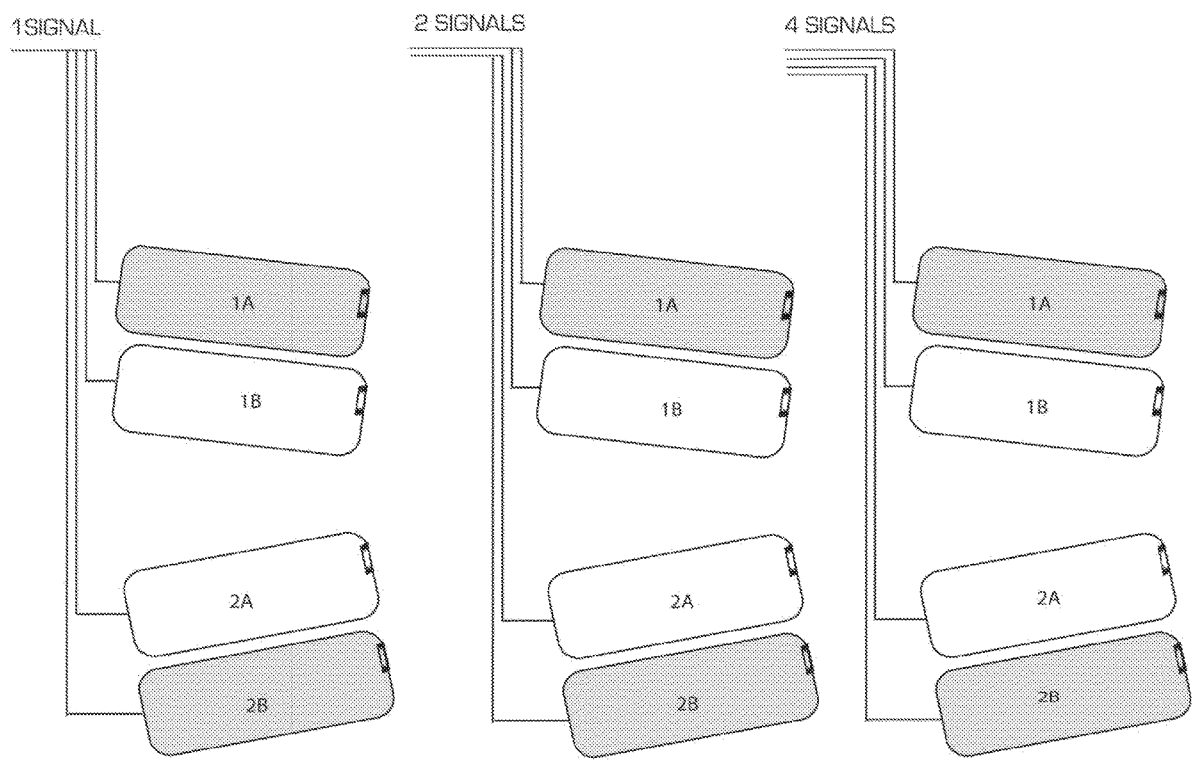
FIG. 2 shows variations in multiscope video signal inputs.

The configuration of FIG. 2 in which pixel 30 includes an electronic shutter formed from shutter gate 32 is merely illustrative. If desired, pixels 30 may be provided with other suitable types of shutter elements, such as mechanical shutter elements or electro-optical shutter elements. For example, each pixel 30 may be provided with a liquid crystal electro-optical shutter (LCEOS). Control signals may be applied to each LCEOS to determine when the LCEOS is transparent (i.e., when the shutter is open) and when the LCEOS is non-transparent (i.e., when the shutter is closed). As another example, pixels 30 may include shutter elements formed from mechanical shutter structures such as micro-electromechanical systems (MEMS) based shutter structures. Configurations in which pixels are provided with electronic shutter elements are merely illustrative and are sometimes described here in as an example.

In the operation of a digital imaging projection, a shutter control signal SG may be pulsed multiple times during an image frame. When signal SG is low, a shutter is OPEN and charge is allowed to accumulate on photodiode. When SG is high, a shutter is closed. A "shutter cycle" may be used herein to refer to a period that includes one closed period in which SG is high and one OPEN period in which SG is low.

At the end of each OPEN period, signal TX is pulsed to transfer the charge that was accumulated during the OPEN period to floating diffusion node. Each OPEN period may have any desired duration. Charge acquisition time $t_{open}$ for each cycle is defined as the time between the falling edge of the SG pulse and the falling edge of the subsequent TX pulse. The charge acquisition times in a given image frame need not have the same duration $t_{open}$. The total charge acquisition time T of pixel during an image frame capture (sometimes referred to as the total pixel exposure time T) may be defined as the sum of all $t_{open}$ the frame acquisition time.

Charge may be transferred from photodiode to floating diffusion node using a short TX pulse at the end of each shutter cycle. During readout time, accumulated charge on floating diffusion node may be converted to a corresponding pixel signal Vout using, for example, a known correlated double sampling technique.

Because $t_{open}$ is much shorter than the length of an image frame, multiple shutter cycles may fit into a portion of a frame length or into the entire frame length without compromising pixel exposure timing (i.e., while maintaining the desired total pixel exposure time T).

By breaking up the total exposure time T during an image frame into shorter, non-continuous integration periods, image artifacts caused by moving objects, flickering lighting, and objects with changing illumination may be minimized without compromising pixel exposure time (i.e., while maintaining the desired total pixel exposure time T).

The timing of shutter pulses may have any suitable pattern. In a model of a timing diagram illustrating different examples of shutter signal schemes for operating shutter of pixel. In still another shutter scheme, signal SG is pulsed at even (uniform) intervals. In another shutter scheme, signal SG is pulsed at random intervals. In one alternative shutter scheme, signal SG is pulsed in even bursts, where each burst includes multiple pulses at even intervals. If desired, other shutter schemes may be used. For example, signal SG may be pulsed in random bursts, where each burst includes multiple pulses and where the bursts occur at random intervals. The schemes discussed are merely illustrative.

Image pixels such as image pixel 30 with dynamically operated electronic shutters may be implemented in electronic rolling shutter (ERS) mode image sensors (e.g., in liner ERS mode image sensors or in high dynamic range (HDR) ERS mode image sensors), or may be implemented in global shutter (GS) mode image sensors, if desired.

In ERS mode image sensors, pixel rows in between a shutter row and a readout row may be controlled using any suitable shutter scheme. In GS mode image sensors, the entire array of pixels may be controlled using any suitable scheme.

If desired, one pixel in image sensor may be controlled using one shutter scheme, whereas another pixel in image sensor may be controlled using another shutter scheme. As another example, groups of pixels may be operated using a common shutter scheme that is different from other groups of pixels in image sensor (e.g., groups of pixels may be operated using a common electronic shutter). In general, any suitable combination of dynamic shutter schemes may be used to control individual pixels in the pixel array of image sensor.

If desired, some pixels may not be operated with a dynamic shutter. For example, one or more pixels may be configured to be continuously exposed during the entire integration time T. Pixels that accumulate charge using this type of continuous integration may be used in combination with pixels that accumulate charge in cycles (if desired). For example, one out of every four rows of pixels may accumulate charge over a continuous integration period, while the other three out of every four rows of pixels may accumulate charge in pulse trains.

Shutter operation may be preferably is controlled by a signal from a wave function generator or circuit which functions in a similar matter. Currently shutters are driven by a sine wave at low frequencies cycle (0-10 HZ) and 14V AC. They can also be driven by square and other waves as required. However, the sine wave has proven most effective thus far with regard to opacity and slow rate of modulation. The specified voltage induces a closed state with complete opacity to block the projected light. The frequency can vary anywhere between 1-240 HZ reflecting different applications as that is the range of the video LCD shutter used, but other TN shutters or Pi cells could be used with similar effect. Individual shutters in the shutter array can be pulsed at the same frequency or separate frequencies. It is necessary for the waves to be in a state of inverse phase-generally meaning they approximate mirror images of each other where peak overlaps trough to render one shutter open and the other closed to produce stereo pairs. The shutter array will likely consist of four to eight or more LCD shutter panels wherein no two shutters are simultaneously open and a sequential order exists between each shutter. Pulsing of shutter array can be consecutive be variously ordered which may reflect motion or eye sensor tracking methodologies. The shutter array transmits a slightly overlapped, identical, offset image-their quantity related to image stabilization or smoothing of the wiggle stereoscopy effect. Increased number of shutters is directly related to the level of stabilization. Shutters are modulated both by waveforms and a second level of control is rendered by timing circuits and/or a microprocessor chip such as an EPROM (erasable programable read only memory or [ROM]), EPROM emulator, or other as of yet undefined sequencing circuitry.

Looking at FIG. 1, it can be seen that two or more projectors produce one or more image stereo pairs which are offset in parallax by the angles of the projectors. Stereo pairs consist of offset identical images switched so that one is on while the other is off. Stereo images pairs are switched on and off at a rate between 0Hz-60 Hz through the use of (DLP) Digital Light Processing, (DMD) Digital Micromirror Devices, (MEMS) Micro-Electrical Mechanical Systems, internal LCD shutters, and/or other projector based, mechanical, timing and switching methods. Higher frequencies (60 Hz-240 Hz) can be used when required by array configuration. This produces a compound, 3-D effect which can include composite layers of depth. The effect can be produced with two projectors or scaled to any number of stereo image pairs. Increasing the number of stereo image pairs stabilizes 3-D objects and images. A projected version of wiggle stereoscopy is achieved by switching on and off between projected stereo image pairs at specific rates based on frequency relationships or stepped sequences to produce stereopsis.

In FIG. 1A, four projectors project two image stereo pairs (1A/1B and 2A/2B) which are offset in parallax by the angles of the projectors. Stereo pairs are switched on and off at a rate between 0 Hz and 60 Hz through the use of (DLP) Digital Light Processing, (DMD) Digital Micromirror Devices, (MEMS) Micro-Electrical Mechanical Systems, and/or other projector, shutter, mechanical, or timing methods to produce a compound, 3-D effect. The projection of two 3-D stereo pairs can be used to produce foreground and background, composite scenery, and/or additional angles of the same image or object. Wiggle stereoscopy is achieved by switching between stereo image pairs in parallax. Sequenced patterns of (1A/1B and 1A/1B) stereo pairs are used in this instance to provide additional perspectives to stabilize stereoscopic wobble. Switching rates determine degree of image stabilization and produce continuous 3-D scenery with complex depth.

In FIG. 1B, four projectors project two image stereo pairs (1A/1B and 2A/2B) which are offset in parallax by the angles of the projectors. Stereo pairs are switched on and off at a rate between 0 Hz and 40 Hz through the use of (DLP) Digital Light Processing, (DMD) Digital Micromirror Devices, (MEMS) Micro-Electrical Mechanical Systems, and/or other projector, shutter, mechanical, or timing methods to produce a compound, 3-D effect. The projection of two 3-D stereo pairs produces foreground and background, composite scenery, and or additional angles of the same image or object. Wiggle stereoscopy is achieved by switching between stereo image pairs in parallax. Sequenced patterns of (1A/1B and 1A/1B) stereo pairs are used in this instance to provide additional perspectives to stabilize stereoscopic wobble. Switching rates determine degree of image stabilization and produce continuous 3-D scenery with complex depth.

In FIGS. 1C, 1D, 1E and 1F, four projectors are sequenced to project two stereo pairs by cycling between interlaced projectors to produce compound parallax. Wiggle stereoscopy is achieved by projecting stereo images in specific frequency combinations at offset incremental angles and focal points. Increasing the number of projectors and stereo pairs provides an additional degree of 3-D image stabilization.

In FIG. 2, input configurations exist ranging from 1:4—where one identical signal produces 2 stereo pairs. 2:4—where 2 different signals produce 2 stereo pairs. And 4:4.—where 4 separate signals can be used to generate stereo pairs based on combinations of four separate signals.

In FIG. 3 two dual function generators (1 and 2) or function generating circuits produce four sine waves (f1, f2, f3, f4) For example: wave (f1) controls shutter (9) and wave (f2) controls shutter (10). They are programmed to produce either specific frequency combination stereo pairs such as (0 Hz/3 Hz and 1 Hz/2 Hz) or stepped, out-of-phase, sine wave stereo pairs. These sine waves determine the on/off position of LCD shutters.

Function generators or function generating circuits are used to program the waveform, frequency, and amplitude of signals modulating the LCD shutter panels (9, 10, 11, 12). The shutter panels are used to modulate two stereoscopic pairs of four projectors (5/6 and 7/8). They are positioned in front of projectors to create two separate video stereo pairs through a slow rate of switching between left and right projective angles which produces the wiggle stereoscopy and Van Hare effect.

The shutter processor (multiplexer) (3) is device that acts as a gate for the four waves produced by the wave function generators and sequences sine waves in programmable order, opening and closing the waveform signals. While frequencies can be sequenced as a stand-alone modulation method, the shutter processor converts the sine wave signals into programmable patterns to control the LCD shutter panels. (9, 10, 11, 12) and provide a secondary level of control.

Two sets of left and right offset video perspectives are switched on and off by frequencies pairs between 0 Hz and 40 Hz which produce the 3-D effect. Additional perspectives increase stabilization of visual turbulence produced by the wiggle stereoscopy effect. The variable cycle shutters in this version are LCD shutter panels, but other versions of the effect can be produced by rapid switching between projectors, DLPs, light sources, or by additional means if the signal path and signal process (software or hardware).

While the current system uses four projectors connected to four identical video feeds (4), layers of stereo pairs can exist with varying content and depth. While this particular version is based on four projectors producing two stereo pairs, the system is scalable to any number of projection sources and devices to produce increased stabilization and/or additional layers to scenery and objects which exhibit complex depth based upon parallax offset and LCD shutter frequency combinations. Immersive environments can be produced by increased numbers of multi-directional, synchronized projection devices.

The Converter Box (4) can receive one video feed up to x video feeds (where x is the number of distinct projectors used). The converter either splits the one video feed to the four or more projectors or sends two or more video feeds to the designated projector(s).

Projectors (5, 6, 7, 8) are devices which can receive and project any video or multimedia feed and modified to perform complex switching through the use of internal (DLP) Digital Light Processing, (DMD) Digital Micromirror Device, (MEMS) Micro-Electrical Mechanical Systems and/or other projector based, mechanical, timing and switching methods or by additional means in the signal path and/or signal processing stages controlled by software, hardware, or combinations of both.

Figure 4A:
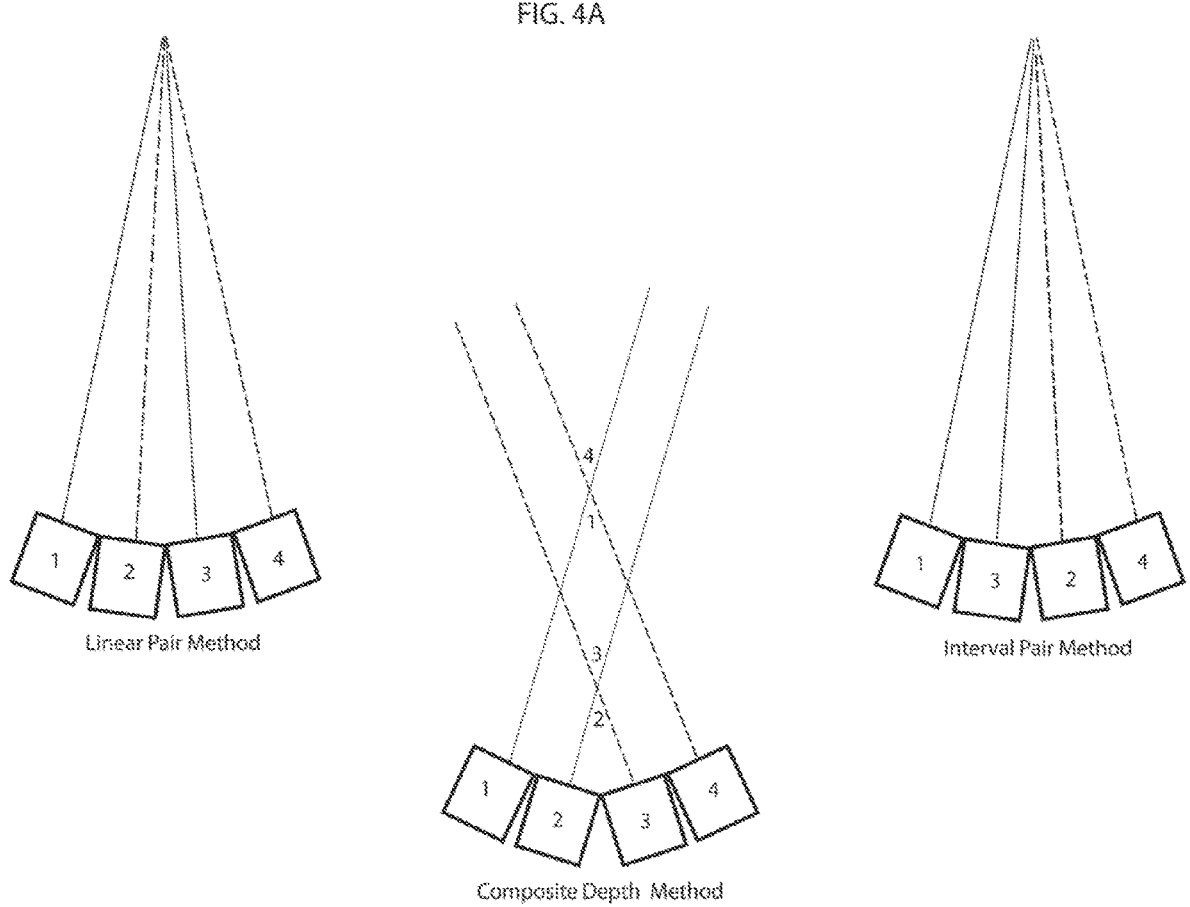
FIG. 4A shows Multiple MULTISCOPE: STEREO PAIR ARRAY CONFIGURATIONS.

In FIG. 4A, the purpose of expanding the shutter or projector stereo pairs into arrays of (4,6,8 . . . ) projectors is to stabilize the image through the use of additional perspective angles. This eliminates the jarring quality of the wiggle stereoscopic effect. An analog of which is the stabilizing influence of additional angles in animated wiggle stereoscopic GIFs. The addition of sufficient incremental angles or stereo pair frames between left and right perspectives allows for decreased visibility of the stereo wiggle due to a multi-frame (left to right) or (right to left) perspective sweep. Multiple stereo pairs are arrayed in such a way as to smooth visual distortion while preserving the Van Hare effect and stereopsis upon the brain. Stereo pair groupings can be arranged in variously configured arrays, the three primary configurations of arrays are concave, convex, and composite depth.

1. Concave array: wherein projector stereo pairs are all pointed inwards converging on a slightly offset focal point. Stereo pairs are arranged following the 180 degree arc so that all projectors focus upon one specified area sequenced in a predetermined order.

2. Convex array: wherein multiple projector stereo pairs are all pointed outwards, producing a panoramic, continuous, or immersive environment of up to 360 degrees sequenced in a predetermined order.

3. Composite depth array: wherein multiple, stereo pairs project foreground and background information using shuttered or switched stereoscopic information at multiple focal points sequenced in a predetermined order. Projectors or shutters can switch between right foreground/left background/left foreground, right background in a linear or non-linear order. Projectors can also be staged at varying distances to produce a similar effect. These arrays project overlapping, incremental, offset, focal points through linear, non-linear, and/or composite depth arrays These arrays project overlapping, incremental, offset, focal points through linear, non-linear, and/or composite depth arrays FIG. 4B shows that linear Pair Array exists where stereo pairs are sequenced in consecutive order:
(1-2, 3-4, 5-6, 7-8).

FIG. 4C shows that aa Non-Linear Array exists where stereo pairs are arranged in intervals (1-3, 2-4, 5-7,6-8) which works to make the transition between subsequent stereo pairs less noticeable and as such provides an additional layer of stabilization.

FIG. 5 shows that stereo pairs can consist of sine waves in opposite phases of peak and trough in overlapping stepped patterns. Stereo pairs can be sequenced as linear pairs, non-linear pairs, or composite depth pairs. Linear pair and non-linear pair methods can be sequenced using stepped sine waves in layers that overlap one another in such a way that each subsequent sine wave is stepped a ¼ cycle in the case of 4 shutters or ⅛ for 8 ad infinitum. The sine wave stepping method is much like separate audio tracks in a sound project or musical notes on a score. These stepped, sine wave, stereo pairs are sequenced to trigger the LCD shutter panels in ordered succession. They can be reordered to trigger different patterns when required by different delivery strategies.

Shutters and projectors can be sequenced by other types of timing circuits, microprocessors, EPROMs, or EPROM emulators. Other control methods can be used to similar effect which should be obvious to those familiar with the art.

Function signals are not just limited to sine waves and square, triangle, other waveforms can also trigger the LCD shutter panels. AC and DC modulation can be used. However, 14 volts AC appears to be the optimal voltage for the LCD shutter panels as it completely blocks all transmissive light. Projectors are best arranged in stereo pairs on a level horizontal plane and aimed inward at varying degrees on a 180 degree arc relative to focal point, desired scale, offset distance, and sequencing method.

FIG. 6 shows that stereo pairs are primarily formed by combinations of separate frequencies which form wiggle stereoscopic pairs. Stereo pair frequency relationships exist between (1 Hz and 2 Hz) sine waves (assigned to one or more stereo pairs) and (0 Hz and 3 Hz) sine waves (assigned to one or more stereo pairs). Several low Hz frequency combinations work to produce various wobbles between 0 Hz and 60 Hz. Combining (1 Hz) and (2 Hz) produces a midrange-wobble and (0 Hz) and (3 Hz) form a wider wobble arc. In one method an array could be formed by one stereo pair modulation combination of (1 Hz) and (2 Hz) and the second pair by the modulation combination of (0 Hz and 3 Hz). Their order could either be linear non-interlaced frequency number systems such as f=1, 2, 3, 4 (frequency in Hz) linear interlaced number systems such as f=0, 1, 2, 3 wherein the wider parallax frequencies enclose those of midrange parallax. Or other methodologies, including, but not limited to non-linear-interlaced number sequences such as f=1, 3, 2, 0 and/or other non-linear variations or combinations thereof. Larger arrays of six or more LCD shutters would reflect different combinations of numbering sequences and strategies which may not be disclosed here. These modulation sequences will evolve into stand-alone time signatures for DLPs, MEMS, and DMDs.

Figure 7:
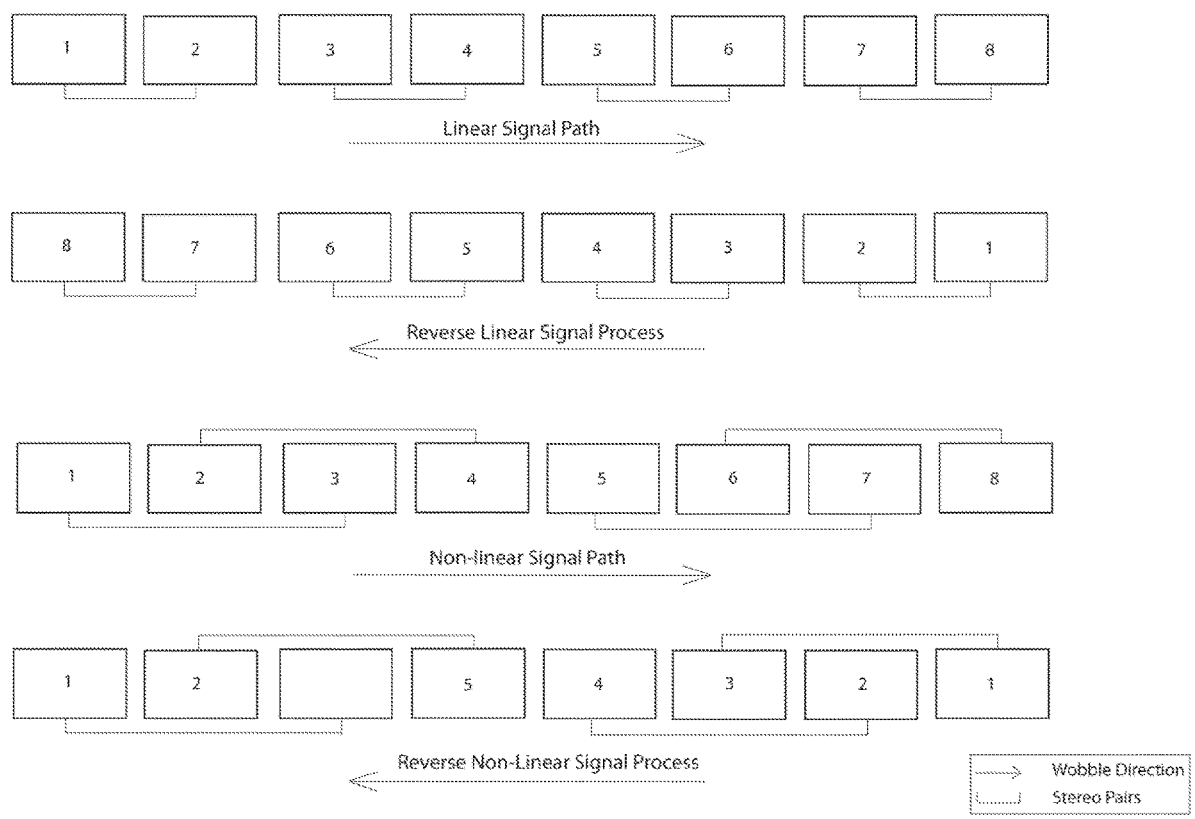
FIG. 7 shows a series of variations in multiscope signal path and signa; process stabilization methods.

FIG. 7 shows that the signal process and signal path can work in conjunction by performing wiggle stereoscopy oscillations in opposite directions as a corrective stabilization. Where the shutter array wobbles from left to right while the preformatted video wobbles from right to left. Stabilization is thus achieved by a slight speed differential between the signal path and signal process in their reverse directional motion. Approximating something similar to a 3-D wagon wheel effect on the W and Z planar axis, which stabilizes the visual turbulence in a corrective fashion. This is an alternate method based on the synthesis of hardware and an informational format designed to perform a similar stabilization function as that produced by a multiple shutter array. It can take the form of a linear signal path and signal process or non-linear signal path and signal process.

Projectors

When the image data captured is in computer or processor or memory stored digital or analog form, it can be displayed (projected onto image capture surfaces) by many variations of image projection devices. These include, but are not limited to LCD (liquid crystal diode), Single chip DLPs, 3 chip DLPs, LED (light emitting diode) based DLPs, Laser based DLPs, OLED based DLPs, LcOs (liquid crystal on silicon), laser diodes, hybrid laser diodes and LED.

Projectors work by delivering an image onto a screen or other flat, neutral surface such as a wall. Central to all projectors is an imaging system that regulates the amount of light reaching the screen. Projectors generally can use three primary colors—red, green and blue—and by mixing these together, in differing amounts, projectors are able to create virtually all colors that humans can see. It is well established in physics and color science, that most colors can be created by the addition of differing amounts of red, green and blue, known as the additive primary colors. Where red, green and blue overlap in a projector system we see this as white. The white has been measured in the past and reported as the "Brightness" level using a measurement scale in units of lumens. This brightness number has been used by the projector industry as a simple way to express a projector's brightness for marketing and sales purposes. But this form of brightness is a measurement only of white light which does not provide any insight into color performance. In other words, a single brightness number has been measured only where red, green and blue overlap.

3 LCD technology uses a system of dichroic mirrors and 3 individual LCD chips to control red, green and blue light. 3 LCD chips that modulate red, green and blue. It is important to note that all three colors are illuminating the screen at the same time—this simultaneous behavior is key to the 3LCD system and is responsible for brighter, more colorful images that can withstand higher levels of ambient room lighting vs 1-Chip DLP (direct light projection). 1-Chip DLP technology works in a totally different way and uses a sequential color wheel that rotates in front of the projector's light source.

The color wheel has red, green and blue filters, and often other segments. The spinning sequential color wheel allows red, green and blue light to pass but not continuously, that is only red or green or blue light is allowed to pass at any one time. When the sequential color wheel rotates quickly the individual colors are usually not seen by the viewer, creating the illusion of a full color image. But there are significant tradeoffs. When the red, green blue are displayed quickly, one after the other, the human brain interprets this as a continuous image (without flicker), so the system works, but the 1-Chip DLP system is not efficient, because while one color of the wheel is projecting light, the other colors are rejected. Thus 1-Chip DLP systems usually produce darker and less colorful images.

There are two main color measurement systems used when analyzing projectors. The older system was approved in 1931 and is called the Yxy system. It has a horseshoe shape and is still widely used. A newer system is called the 1976 L*a*b* system. While both systems represent color in a "system independent" scientific manner, it is better to use the newer 1976 L*a*b* system for a number of reasons. The Yxy diagram is not perceptually uniform and this limits its usage. The newer L*a*b* diagram is better in terms of perceptual uniformity. In the 1931 Yxy diagram the green color takes up a large area, compressing blue and red into smaller corners. (FIG. 3) Notice in the 1976 L*a*b* diagram, how the colors are more evenly spaced—the green does not occupy the whole top of the diagram and the diagram has a non-distorted, circular shape. In terms of color science, we say the L*a*b* diagram is more "perceptually uniform", so in this application we will use the newer 1976 L*a*b* diagram.

The 3LCD projector gamut has a fuller volume, while the 1-Chip DLP projector exhibits a smaller, lower overall volume with a sharp, tall steeple. Because 1-Chip DLP projector systems are inefficient due to the sequential color wheel, manufacturers often manipulate the wheel to artificially obtain a higher White Light Output. This is often accomplished by introducing a clear or white segment. The white segment artificially boosts white to a sharp point, and it is at this point where the old measurement for "Brightness" is made. So in the 3-dimensional color space, the 1-Chip DLP projector does not make a bright white when used in the normal red-green-blue mode. But by adding a white or clear segment to the color wheel, White Light Output extends to a sharp peak allowing a manufacturer to report a higher White Light Output, which is often marketed as a single "Brightness" number. Viewed on the gamut plot, the addition of the clear white segment results in pulling white up to a sharp point. Gamut maps for different 1-Chip DLP projectors will vary model to model, but in general, 1-Chip DLP projectors will show a similar response.

There are two separate and different metrics for projectors: ☐ White Light Output also known as White Brightness ☐ Color Light Output also known as Color Brightness Both metrics, White Light Output and Color Light Output are measured in lumens. "Brightness" only refers to White Light Output and is the number used in the past and currently by most 1-Chip DLP manufacturers for marketing and sales purposes. Color Light Output is a new international measurement standard, which gives projector buyers a better way to assess a projector's true color and white point capabilities. Let us see how these two metrics are calculated in the case of 3LCD and 1-Chip DLP projector systems. White Light Output is measured by considering the white point, or center point. The amount of light projected on the screen is measured and has been reported as "Brightness". We can compute the new metric called Color Light Output, and thus calculate Color Light Output in lumens. For 3LCD projector systems using the efficient addition of red-green-blue light, White Light Output and Color Light Output are generally the same number.

In 1-Chip DLP projector systems white is often added to the color wheel to artificially boost White Light Output. But when we compute the Color Light Output, we get a dramatically lower number. In most scenarios 1-Chip DLP projectors have a Color Light Output that is 3 times lower than their White Light Output. A 3LCD projector has the same rating for White Light Output and Color Light Output, while a 1-Chip DLP projector has a much lower Color Light Output. While a single brightness number would be convenient for buyers of projectors, white brightness alone is not an effective way to understand the performance of a projector.

The International Committee for Display Metrology (ICDM) recognized the confusion between White Light Output and Color Light Output and addressed the problem. After careful research, the ICDM published a specification2 for both Light Output and Color Output in June, 2012. Projector buyers should look for, and request a Color Light Output or Color Brightness number for any projector before making a purchase. The ICDM 2012 standard applies to all displays including projectors for business, education or home use. This standard for Color Light Output gives end users a way with which to rank and rate a projector from an independent perspective. Leading manufacturers have adopted the standard and report both White Light Output and Color Light Output for their products. Some manufacturers have elected to not publish the Color Light Output for their projectors. This may be due to a reluctance to show that their products have significantly lower Color Light Output. Customers should look for and demand both the White Light Output and Color Light Output numbers and seek projectors with high levels of both numbers. If a manufacturer does not provide both a White Light Output and Color Light Output number, hundreds of projectors have been independently tested for both numbers and results are available at www.colorlightoutput.com.

Summary

There are two main projector systems used for business and education, 3LCD and 1-Chip DLP. 3LCD projects red-green-blue light simultaneously, 1-Chip DLP uses a rotating color wheel that projects color sequentially. ☐ Color Light Output is also known as Color Brightness. White Light Output is also known as White Brightness. ☐ A single "Brightness" number does not provide the information needed to understand a projector's performance. To determine a projector's true performance, look for high values of both Color Brightness and White Brightness. ☐ Color Light Output is an international scientific standard developed by the International Committee for Display Metrology.

Image Capture Devices

Any reflective surface may be used, such as walls, reflective screens, and even solid objects with internal reflective surfaces. Reflective beads may be used where highest resolution isn't critical. Move screens, reflective bead-covered metal surfaces. Capture devices may also in certain cases refer to cameras, 3-D scanners or other methods for delivering live or pre-recorded content to be transmitted, formatted, or otherwise integrated into the stereoscopic, 3-D format.

The system and method of the present technology may also execute display of stored data wherein the source of data is memory in linked to a computer in communication with the projector and the computer is configured to execute software which modulates the display of left-right view sets so that there is a sequential order between the stereo pairs.

As far as projection parameters are generally considered, as they are affected by the waveform, a significant use of the waveforms is to modulate the LCD shutter panels in such a way that one is off while the other is on. In this manner, stereo pairs exist wherein one is off while the other is on. There may be further modulation of the arrays so that there is a sequential order between the stereo pairs wherein they stabilize wobble by providing an increased number of incremental offset angles (perspectives) through frequency-based sequencing methods. This can also be achieved by timing circuits and sequencing devices where the system is not shutter based. Shutter opacity is a direct function of the amplitude, and a low frequency (0 Hz-60 Hz) sine wave seems to work best with regard to the wiggle stereoscopic effect as it requires a slower oscillation between LCD panels as opposed to HMD (head mounted display) type systems which are oriented towards rapid triggering of the shutters (higher frequencies) to exceed persistence of vision. However, this does not negate the use of higher frequencies (60 Hz-240 Hz), faster switching rates, and other waveforms (such as square waves) in conjunction with the sine waves as may be required by the array configuration. This slow oscillation is achieved by either the frequency pair relationships or the stepped waveform sequencing method cited in the descriptions. As this is a monocular form 3-D visualization, the stereopsis exists as the result of seeing both left and right perspectives (manually or otherwise offset) on the verge of temporal convergence.

What is claimed:

1. A system for the projection of virtual 3-D images onto a surface, the system having perspective shifting viewing capability comprising:
   a source of data for at least two different paired left-right view sets of one subject,
   an image reflecting surface,
   a projector capable of simultaneously projecting pairs of left-right view sets, and the projector being capable of changing projected displays of left-right view sets of images from a first set to a second set, the changing projected left-right view sets creating a stereopsis effect in which content of a complete projected image, which projected image appears to move in perspective.

2. The system of claim 1 wherein there are at least four sets of paired left-right view sets, and the system is configured to display each of the at least four left-right view sets in a progressive order from relatively left-most or right-most set through the at least four left-right view sets to the right-most or left-most view set, respectively, to provide a rotating view of the one subject.

3. The system of claim 1 wherein the projector is able to shift from the first set to the second set with a transition time of less than 0.08 seconds.

4. The system of claim 2 wherein the projector is able to shift in the progressive order from the first set through progressive adjacent view sets with a transition time between each progressive adjacent set of less than 0.08 seconds.

5. The system of claim 1 wherein the capability of changing projected left-right view sets of images from a first set of the paired left-right view sets to a second set of the paired left-right view sets includes transitioning from the first set to the second set by removing one half of the first pair set and replacing in projection the removed one half with a corresponding left-right component of the second pair set, then removing a remaining one half of the first pair set and replacing it in projection with a remaining one half of the second pair set. projector and the computer is configured to execute software which modulates the projection of the display of left-right view sets so that there is a sequential order between the stereo pairs.

6. A method for projecting virtual 3-D images onto or into a surface with perspective shifting viewing capability comprising:
   providing a source of data for at least two different paired left-right view sets of one subject image,
   providing an image reflecting surface,
   simultaneously projecting pairs of left-right view sets from the data onto the image reflecting surface,
   and changing projected left-right view sets of images from a first left-right view set of the one subject image to a second left-right view set of the one subject image to create a stereopsis effect in which content of a complete projected image of the one set appears to move in perspective.

7. The method of claim 6 further comprising changing projected left-right view sets of images from a first pair set to a second set includes transitioning from the first set to the second pair set by removing one half of the first pair set and replacing in projection the removed one half of the first pair set with a corresponding left-right component of the second pair set of the paired left-right view sets, then removing a remaining one half of the first pair set and replacing it in projection with a remaining one half of the second pair set.

8. The method of claim 6 wherein there are multiple pair sets of stereoscopic images of the one subject image by projecting at least one waveform representing time-variant fluctuations of intensity of the one subject image.

9. The method of claim 8 wherein the waveform has a frequency of the modulation, and an amplitude or a depth of the modulation varies in an illumination intensity from its peak value.

10. The method of claim 8 wherein the waveform is inter-converted with a predetermined modulation depth.

11. The method of claim 8 wherein the wavelength of the illumination and an illumination intensity of the one subject image are combined into a single parameter for human sensitivities of rods and cones.

12. The method of claim 6 wherein the source of data is a live source transmitted by a single or multiple capture devices which capture and multiply a single image or capture several perspectives arranged in such a way that they reflect the configuration of the projector array or are reordered in such a way as to work in conjunction with said projector array.

* * * * *